United States Patent
Gao et al.

(10) Patent No.: US 11,540,237 B2
(45) Date of Patent: Dec. 27, 2022

(54) SYNCHRONIZATION METHOD AND APPARATUS

(71) Applicant: HUAWEI TECHNOLOGIES CO., LTD., Guangdong (CN)

(72) Inventors: Lei Gao, Beijing (CN); Deping Liu, Beijing (CN); Zhenwei Lu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 107 days.

(21) Appl. No.: 16/883,063

(22) Filed: May 26, 2020

(65) Prior Publication Data
US 2020/0288419 A1 Sep. 10, 2020

Related U.S. Application Data

(63) Continuation of application No. PCT/CN2017/113087, filed on Nov. 27, 2017.

(51) Int. Cl.
*H04W 56/00* (2009.01)
*H04W 4/46* (2018.01)
*H04W 92/18* (2009.01)

(52) U.S. Cl.
CPC ........... *H04W 56/001* (2013.01); *H04W 4/46* (2018.02); *H04W 92/18* (2013.01)

(58) Field of Classification Search
None
See application file for complete search history.

(56) References Cited

U.S. PATENT DOCUMENTS

| 2007/0140106 A1 | 6/2007 | Tsai et al. |
| 2008/0089282 A1* | 4/2008 | Malladi ............... H04L 27/2675 370/329 |
| 2013/0203424 A1 | 8/2013 | Van Phan et al. |

(Continued)

FOREIGN PATENT DOCUMENTS

| CN | 101507223 A | 8/2009 |
| CN | 103428817 A | 12/2013 |

(Continued)

OTHER PUBLICATIONS

ITL, Considerations on Sequence Design for Synchronization Signal. 3GPP TSG RAN WG1 NR Ad-hoc Meeting, Spokane, USA, Jan. 16-20, 2017, R1-1701038, 5 pages.

(Continued)

*Primary Examiner* — Nicholas Sloms
(74) *Attorney, Agent, or Firm* — Womble Bond Dickinson (US) LLP (57) ABSTRACT

A synchronization method includes: determining a data signal, where a target sequence in the data signal is mapped to at least one symbol that includes the first symbol within a time unit, data in the data signal is mapped to at least one another symbol in the time unit other than the at least one symbol, the first symbol includes a cyclic prefix, and the target sequence is used by a second device to synchronize the data signal; and sending the data signal to the second device in the time unit. In the present disclosure, a sequence used to synchronize a data signal for each transmission is mapped at an equal spacing to at least one symbol that includes the first symbol within a time unit for the current transmission.

17 Claims, 4 Drawing Sheets

(56) References Cited

U.S. PATENT DOCUMENTS

| | | | |
|---|---|---|---|
| 2016/0029331 A1* | 1/2016 | Seo | H04L 27/2613 370/350 |
| 2016/0128009 A1* | 5/2016 | Yoon | H04W 56/001 370/350 |
| 2017/0055234 A1* | 2/2017 | Seo | H04W 56/002 |
| 2017/0079026 A1* | 3/2017 | Li | H04L 5/0091 |
| 2017/0188319 A1* | 6/2017 | Seo | H04W 48/16 |
| 2017/0223648 A1* | 8/2017 | Shin | H04W 56/005 |
| 2017/0273042 A1* | 9/2017 | Shilov | H04W 56/002 |
| 2017/0289935 A1* | 10/2017 | Yoon | H04B 1/3822 |
| 2018/0054788 A1* | 2/2018 | Kwon | H04L 27/2675 |
| 2018/0092064 A1* | 3/2018 | Ryu | H04L 27/2613 |
| 2018/0287844 A1* | 10/2018 | Kim | H04L 5/005 |
| 2019/0116567 A1* | 4/2019 | Zhang | H04L 5/005 |
| 2019/0124637 A1 | 4/2019 | Li et al. | |

FOREIGN PATENT DOCUMENTS

| | | | | |
|---|---|---|---|---|
| CN | 104640195 A | 5/2015 | | |
| CN | 105101458 A | 11/2015 | | |
| CN | 105659675 A | 6/2016 | | |
| CN | 106464402 A | 2/2017 | | |
| CN | 106464404 A | 2/2017 | | |
| CN | 106605433 A | 4/2017 | | |
| CN | 106664674 A | 5/2017 | | |
| CN | 107124243 A | 9/2017 | | |
| EP | 3142273 A1 * | 3/2017 | | H04L 5/0048 |
| WO | 2017004774 A1 | 1/2017 | | |
| WO | WO-2017096121 A1 * | 6/2017 | | H04B 7/0408 |
| WO | WO-2017171487 A2 * | 10/2017 | | H04L 5/0051 |

OTHER PUBLICATIONS

TSG RAN WG1, Status Report to TSG, LTE Device to Device Proximity Services. 3GPP TSG RAN meeting #66, Maui, USA, Dec. 8-11, 2014, RP-141894, 38 pages.

* cited by examiner

SYNCHRONIZATION METHOD AND APPARATUS

CROSS-REFERENCE TO RELATED APPLICATIONS

This application is a continuation of International Application No. PCT/CN2017/113087, filed on Nov. 27, 2017, the disclosure of which is hereby incorporated by reference in its entirety.

TECHNICAL FIELD

The present disclosure relates to the field of communications technologies, and in particular, to a synchronization method and apparatus.

BACKGROUND

An Internet of Vehicles system implements information sharing through communication between vehicles, between a vehicle and a piece of transportation infrastructure, and between a vehicle and a pedestrian. To ensure safe driving of vehicles, user equipment (UE) in the Internet of Vehicles system need to exchange data with each other, for example, periodically send UE information, such as a location, a speed, and a status, to surrounding UE. A 5G network (new radio, NR) technology is a next-generation mainstream wireless communications technology. Currently, a 5G-based Internet of Vehicles technology is being studied in the industry to provide reliable data transmission and exchange for UEs in the Internet of Vehicles system. During data exchange, to ensure that data can be correctly received, receiving UE needs to synchronize a data signal transmitted by sending UE.

Currently, in an Internet of Vehicles technology based on long term evolution (LTE), when two UEs exchange data, synchronization may be separately performed based on a downlink synchronization signal sent by a base station. If this synchronization solution is still adopted in the 5G-based Internet of Vehicles technology, the following problem exists: Because a higher frequency band and higher bandwidth need to be supported in the 5G NR technology, in some potential frequency bands that may be selected on the Internet of Vehicles, the prior art in which UE performs synchronization based on a downlink synchronization signal delivered by the base station cannot meet a requirement of UE in the Internet of Vehicles system for synchronizing a data signal transmitted by another UE.

SUMMARY

Embodiments of the present disclosure provide a synchronization method and apparatus to resolve a problem that a synchronization requirement cannot be met in a related technology. The technical solutions are as follows.

According to a first aspect, a synchronization method is provided, and the method includes:

determining a data signal, where a target sequence in the data signal is mapped to at least one symbol that includes the first symbol within a time unit, data in the data signal is mapped to at least one another symbol within the time unit other than the at least one symbol, the first symbol includes a cyclic prefix (CP), and the target sequence is used by a second device to synchronize the data signal; and sending the data signal to the second device in the time unit.

According to the method provided in this embodiment of the present disclosure, a sequence used to synchronize a data signal for current transmission is mapped to at least one symbol that includes the first symbol within a time unit, so that a device that receives the data signal can synchronize the data signal based on the received sequence and a known sequence used for synchronization, thereby meeting a requirement of a device in an Internet of Vehicles system for synchronizing a data signal transmitted by another device.

In one embodiment, the target sequence is mapped at an equal spacing to frequency domain corresponding to the at least one symbol, a remaining part of the frequency domain is filled with 0 or the target sequence is cyclically mapped to the remaining part, and a spacing for the equally-spaced mapping is at least one subcarrier; or the target sequence is consecutively mapped to frequency domain corresponding to the at least one symbol, and a remaining part of the frequency domain is filled with 0 or the target sequence is cyclically mapped to the remaining part.

According to the method provided in this embodiment of the present disclosure, the first device may map a sequence used for synchronization to the symbol within the time unit at an equal spacing or consecutively, so that the second device can synchronize the data signal based on the received sequence and the known sequence used for synchronization, thereby meeting a requirement of a device in an Internet of Vehicles system for synchronizing a data signal transmitted by another device.

In one embodiment, the data includes at least service data and/or scheduling assignment information.

According to the method provided in this embodiment of the present disclosure, the service data and/or the scheduling assignment information are/is carried in the data signal as to-be-transmitted data, so that a device that receives the data signal can synchronously receive the service data and/or the scheduling assignment information.

In one embodiment, the time unit includes: one transmission time interval (TTI), a plurality of bundled consecutive TTIs, one short transmission time interval (sTTI), a plurality of bundled consecutive sTTIs, one subframe, a plurality of bundled consecutive subframes, one slot slot, or a plurality of bundled consecutive slots.

According to the method provided in this embodiment of the present disclosure, the time unit may include one TTI (one sTTI, one slot, or one subframe) or a plurality of bundled consecutive TTIs (sTTIs, slots, or subframes), so that only one mapping process is required for the plurality of TTIs (sTTIs, slots, or subframes), and overheads can be reduced.

In one embodiment, each data signal includes a target sequence mapped to at least one symbol that includes the first symbol within a time unit corresponding to the data signal.

According to the method provided in this embodiment of the present disclosure, a sequence used to synchronize a data signal for each transmission is mapped at an equal spacing to at least one symbol that includes the first symbol within a time unit for current transmission, so that a device that receives the data signal can synchronize the data signal based on a received sequence and a known sequence used for synchronization, thereby meeting a requirement of a device in an Internet of Vehicles system for synchronizing a data signal transmitted by another device.

In one embodiment, the target sequence is an M sequence modulated based on binary phase shift keying (BPSK), or a zero correlation (ZC) sequence.

According to the method provided in this embodiment of the present disclosure, the first device may map, within the time unit for current data transmission, the M sequence modulated based on the BPSK or map the ZC sequence. When the ZC sequence is mapped, the symbol to which the sequence is mapped has a relatively low peak-to-average power ratio.

According to a second aspect, a synchronization method is provided, and the method includes:

receiving a data signal from a first device in a time unit, where the data signal includes data and a first sequence, and the first sequence is used by the second device to synchronize the data signal;

determining the first sequence based on a sequence received on at least one symbol that includes the first symbol within the time unit, and a CP included in the first symbol; and synchronizing the data signal based on the first sequence and a target sequence corresponding to the first sequence.

According to the method provided in this embodiment of the present disclosure, the sequence used for synchronization is determined in a process of receiving the data signal, and the data signal is synchronized based on the received sequence and a known sequence used for synchronization, thereby meeting a requirement of a device in an Internet of Vehicles system for synchronizing a data signal transmitted by another device.

In one embodiment, the target sequence is mapped at an equal spacing to frequency domain corresponding to the at least one symbol, and a spacing for the equally-spaced mapping is at least one subcarrier, or the target sequence is consecutively mapped to frequency domain corresponding to the at least one symbol.

According to the method provided in this embodiment of the present disclosure, the sequence used for synchronization may be mapped at an equal spacing to the symbol within the time unit, or may be consecutively mapped to the symbol within the time unit, so that the second device can synchronize the data signal based on the received sequence and the known sequence used for synchronization, thereby meeting a requirement of a device in an Internet of Vehicles system for synchronizing a data signal transmitted by another device.

In one embodiment, the data includes at least service data and/or scheduling assignment information.

According to the method provided in this embodiment of the present disclosure, the service data and/or the scheduling assignment information are/is carried in the data signal as to-be-transmitted data, so that a device that receives the data signal can synchronously receive the service data and/or the scheduling assignment information.

In one embodiment, the time unit includes: one transmission time interval TTI, a plurality of bundled consecutive TTIs, one short transmission time interval sTTI, a plurality of bundled consecutive sTTIs, one subframe, a plurality of bundled consecutive subframes, one slot slot, or a plurality of bundled consecutive slots.

According to the method provided in this embodiment of the present disclosure, the time unit may include one TTI (one sTTI, one slot, or one subframe) or a plurality of bundled consecutive TTIs (sTTIs, slots, or subframes), so that only one mapping process is required for the plurality of TTIs (sTTIs, slots, or subframes), and overheads can be reduced.

In one embodiment, the target sequence is an M sequence modulated based on BPSK, or a ZC sequence.

According to the method provided in this embodiment of the present disclosure, the sequence used for synchronization may be the M sequence modulated based on the BPSK, or the ZC sequence. When the sequence is the ZC sequence, the symbol to which the sequence is mapped has a relatively low peak-to-average power ratio.

In one embodiment, before the synchronizing the data signal based on the first sequence and a target sequence corresponding to the first sequence, the method further includes:

obtaining the target sequence preconfigured in a protocol; or obtaining the target sequence according to an obtaining rule indicated in the protocol; or receiving the target sequence sent by a base station; or obtaining the target sequence according to an obtaining rule sent by the base station.

According to the method provided in this embodiment of the present disclosure, a device that receives the data signal may obtain the sequence used for synchronization directly from the protocol, or may obtain the sequence used for synchronization according to the obtaining rule indicated in the protocol, and two manners of obtaining the synchronization sequence are provided.

In one embodiment, the method further includes:

determining, based on the equally-spaced mapping or the consecutive mapping, a synchronization algorithm used for synchronization; and the synchronizing the data signal based on the first sequence and a target sequence corresponding to the first sequence includes synchronizing the data signal by using the synchronization algorithm and based on the first sequence and the target sequence.

According to the method provided in this embodiment of the present disclosure, synchronization may be implemented by using synchronization algorithms corresponding to different mapping manners of the sequence used for synchronization. In a case of the equally-spaced mapping, time synchronization may be implemented by using a time domain cross-correlation algorithm or a frequency domain time synchronization algorithm with relatively low complexity, and frequency synchronization may be implemented by using a CP-based frequency synchronization algorithm, so as to overcome a multipath effect and improve frequency synchronization precision.

In one embodiment, the first symbol includes a first portion and a second portion, the first portion includes the CP, a time domain sequence corresponding to a head part of the second portion is the same as a time domain sequence corresponding to a tail part of the second portion, and a length of the head part is greater than a length of the CP.

According to the method provided in this embodiment of the present disclosure, the first symbol to which the sequence used for synchronization is mapped includes the CP and a part of the first half symbol to perform automatic gain control (AGC) on the data received at the current time, and the first symbol further includes a structure similar to a symbol that includes a CP, to synchronize the data transmitted at the current time and improve data synchronization precision.

In one embodiment, when the target sequence is mapped at an equal spacing to the at least one symbol, after the receiving a data signal from a first device in a time unit, the method further includes:

performing AGC on the data based on the first portion of the first symbol.

According to the method provided in this embodiment of the present disclosure, because the first symbol includes the CP, AGC may be performed starting from the CP. However, a time length for performing AGC is fixed. Therefore, a time length used to perform AGC is shorter in the first symbol, thereby reducing a time length for impacting the first symbol by AGC.

In one embodiment, when the synchronization algorithm used for synchronization is determined based on the equally-spaced mapping, the synchronizing the data signal by using the synchronization algorithm and based on the first sequence and the target sequence includes:

transforming, into frequency domain, the first symbol to which the first sequence is mapped;

performing pointwise multiplication on a conjugate of a location corresponding to the target sequence to obtain a frequency domain channel;

transforming the frequency domain channel into time domain and obtaining a modulus value;

determining a timing offset for current transmission based on a location corresponding to a maximum modulus value;

obtaining a frequency offset for current transmission based on a phase difference between a first time domain sequence corresponding to the first symbol and a second time domain sequence corresponding to the first symbol, where the first time domain sequence is the time domain sequence corresponding to the head part of the second portion of the first symbol, and the second time domain sequence is the time domain sequence corresponding to the tail part of the first symbol; and obtaining the data in the data signal based on the timing offset and the frequency offset.

According to the method provided in this embodiment of the present disclosure, the timing offset is obtained by using the sequence used for synchronization, and the frequency offset is obtained by using the structure similar to the symbol that includes the CP and that is in the symbol to which the sequence is mapped at an equal spacing, so that the second device can accurately obtain the data in the data signal, and a synchronization algorithm for the equally-spaced mapping is provided.

In one embodiment, when the first sequence is consecutively mapped to the at least one symbol, after the receiving a data signal from a first device in a time unit, the method further includes:

performing AGC on the data based on a part that includes the CP and that is in the first symbol.

According to the method provided in this embodiment of the present disclosure, because the first symbol includes the CP, AGC may be performed starting from the CP. However, a time length for performing AGC is fixed. Therefore, a time length used to perform AGC is shorter in the first symbol, thereby reducing a time length for impacting the first symbol by AGC.

In one embodiment, when the synchronization algorithm used for synchronization is determined based on the consecutive mapping, the synchronizing the data signal by using the synchronization algorithm and based on the first sequence and the target sequence includes:

performing a cross-correlation operation on a third time domain sequence and a fourth time domain sequence to obtain a correlation peak, where the third time domain sequence is a time domain sequence corresponding to a remaining part in the first symbol except the part that includes the CP, and the fourth time domain sequence is a time domain sequence corresponding to the target sequence;

obtaining timing for current data transmission based on a location of the correlation peak;

multiplying the third time domain sequence by a conjugate of a part corresponding to the fourth time domain sequence to obtain a fifth time domain sequence;

obtaining a frequency offset for current data transmission based on the fifth time domain sequence; and obtaining the data in the data signal based on the timing and the frequency offset.

According to the method provided in this embodiment of the present disclosure, the timing and the frequency offset for current data transmission are obtained based on the received first sequence used for synchronization, and the known target sequence used for synchronization, so that the data in the data signal can be accurately obtained, and a synchronization algorithm for the consecutive mapping is provided.

According to a third aspect, a synchronization apparatus is provided. The apparatus includes a plurality of function modules, and the plurality of function modules are configured to perform the synchronization method provided in any one of the embodiments of the first aspect.

According to a fourth aspect, a synchronization apparatus is provided. The apparatus includes a plurality of function modules, and the plurality of function modules are configured to perform the synchronization method provided in any one of the embodiments of the second aspect.

According to a fifth aspect, a synchronization apparatus is provided, and the synchronization apparatus includes a processor, and a memory configured to store a processor executable instruction. The executable instruction is used to: determine a data signal, where a target sequence in the data signal is mapped to at least one symbol that includes the first symbol within a time unit, data in the data signal is mapped to at least one another symbol within the time unit other than the at least one symbol, the first symbol includes a CP, and the target sequence is used by a second device to synchronize the data signal; and send the data signal to the second device within the time unit.

In one embodiment, the target sequence is mapped at an equal spacing to frequency domain corresponding to the at least one symbol, a remaining part of the frequency domain is filled with 0 or the target sequence is cyclically mapped to the remaining part, and a spacing for the equally-spaced mapping is at least one subcarrier. Alternatively, the target sequence is consecutively mapped to frequency domain corresponding to the at least one symbol, and a remaining part of the frequency domain is filled with 0 or the target sequence is cyclically mapped to the remaining part.

In one embodiment, the data includes at least service data and/or scheduling assignment information.

In one embodiment, the time unit includes: one TTI, a plurality of bundled consecutive TTIs, one sTTI, a plurality of bundled consecutive sTTIs, one subframe, a plurality of bundled consecutive subframes, one slot slot, or a plurality of bundled consecutive slots.

In one embodiment, each data signal includes a target sequence mapped to at least one symbol that includes the first symbol within a time unit corresponding to the data signal.

In one embodiment, the target sequence is an M sequence modulated based on BPSK, or a ZC sequence.

According to a sixth aspect, a computer-readable storage medium is provided. The computer-readable storage medium stores a computer program, and the computer program is loaded and executed by a processor to implement the synchronization method provided in any one of the embodiments of the first aspect.

According to a seventh aspect, a synchronization apparatus is provided, and the synchronization apparatus includes a processor, and a memory configured to store a processor executable instruction. The executable instruction is used to: receive a data signal from a first device within a time unit, where the data signal includes data and a first sequence, and the first sequence is used by the second device to synchronize the data signal; determine the first sequence based on a sequence received on at least one symbol that includes the first symbol within the time unit, and a CP included in the first symbol; and synchronize the data signal based on the first sequence and a target sequence corresponding to the first sequence.

In one embodiment, the target sequence is mapped at an equal spacing to frequency domain corresponding to the at least one symbol, and a spacing for the equally-spaced mapping is at least one subcarrier, or the target sequence is consecutively mapped to frequency domain corresponding to the at least one symbol.

In one embodiment, the data includes at least service data and/or scheduling assignment information.

In one embodiment, the time unit includes: one transmission time interval TTI, a plurality of bundled consecutive TTIs, one short transmission time interval sTTI, a plurality of bundled consecutive sTTIs, one subframe, a plurality of bundled consecutive subframes, one slot slot, or a plurality of bundled consecutive slots.

In one embodiment, the target sequence is an M sequence modulated based on binary phase shift keying BPSK, or a ZC sequence.

In one embodiment, the executable instruction is further used to: obtain the target sequence preconfigured in a protocol; or obtain the target sequence according to an obtaining rule indicated in the protocol; or receive the target sequence sent by a base station; or obtain the target sequence according to an obtaining rule sent by the base station.

In one embodiment, the executable instruction is further used to determine, based on the equally-spaced mapping or the consecutive mapping, a synchronization algorithm used for synchronization. The synchronizing the data signal based on the first sequence and a target sequence corresponding to the first sequence includes synchronizing the data signal by using the synchronization algorithm and based on the first sequence and the target sequence.

In one embodiment, the first symbol includes a first portion and a second portion, the first portion includes the CP, a time domain sequence corresponding to a head part of the second portion is the same as a time domain sequence corresponding to a tail part of the second portion, and a length of the head part is greater than a length of the CP.

In one embodiment, the executable instruction is further used to perform AGC on the data based on the first portion of the first symbol.

In one embodiment, the executable instruction is used to: transform, into frequency domain, the first symbol to which the first sequence is mapped; perform pointwise multiplication on a conjugate of a location corresponding to the target sequence in frequency domain to obtain a frequency domain channel; transform the frequency domain channel into time domain and obtain a modulus value; determine a timing offset for current transmission based on a location corresponding to a maximum modulus value; obtain a frequency offset for current transmission based on a phase difference between a first time domain sequence corresponding to the first symbol and a second time domain sequence corresponding to the first symbol, where the first time domain sequence is the time domain sequence corresponding to the head part of the second portion of the first symbol, and the second time domain sequence is the time domain sequence corresponding to the tail part of the first symbol; and obtain the data in the data signal based on the timing offset and the frequency offset.

In one embodiment, the executable instruction is further used to perform AGC on the data based on the part that includes the CP and that is in the first symbol.

In one embodiment, the executable instruction is further used to: perform a cross-correlation operation on a third time domain sequence and a fourth time domain sequence to obtain a correlation peak, where the third time domain sequence is a time domain sequence corresponding to a remaining part in the first symbol except the part that includes the CP, and the fourth time domain sequence is a time domain sequence corresponding to the target sequence; obtain timing for current data transmission based on a location of the correlation peak; multiply the third time domain sequence by a conjugate of a part corresponding to the fourth time domain sequence to obtain a fifth time domain sequence; obtain a frequency offset for current data transmission based on the fifth time domain sequence; and obtain the data in the data signal based on the timing and the frequency offset.

According to an eighth aspect, a computer-readable storage medium is provided. The computer-readable storage medium stores a computer program, and the computer program is loaded and executed by a processor to implement the synchronization method provided in any one of the embodiments of the second aspect.

DESCRIPTION OF EMBODIMENTS

To make the objectives, technical solutions, and advantages of embodiments of the present disclosure clearer, the following further describes the embodiments of the present disclosure in detail with reference to the accompanying drawings.

According to the solution in the background, if two UEs are synchronized based on a downlink synchronization signal sent by a base station, a requirement of UE in an Internet of Vehicles system for synchronizing a data signal transmitted by another UE cannot be met. The following uses a carrier frequency of 64 GHz (a potential frequency band that may be selected on the Internet of Vehicles) as an example for description.

A plurality of combinations of subcarrier spacings (SCS) and CP lengths are designed in a 5G NR technology, so as to support a higher frequency band and higher bandwidth than those in LTE. Table 1 provides some combinations that are of SCSs and CP lengths and that are supported in current standard discussion. A CP includes a normal cyclic prefix (NCP) or an extended cyclic prefix (ECP).

TABLE 1

| SCS (corresponding to a length of a symbol without a CP) | NCP length | ECP length |
| --- | --- | --- |
| 15 kHz (67 μs) | 4.7 μs (5.2 μs) | — |
| 30 kHz (33 μs) | 2.3 μs (2.9 μs) | — |
| 60 kHz (17 μs) | 1.2 μs (1.7 μs) | 4.2 μs |
| 120 kHz (8.3 μs) | 0.59 μs (1.1 μs) | — |
| 240 kHz (4.2 μs) | 0.29 μs (0.81 μs) | — |
| 480 kHz (2.1 μs) | 0.15 μs (0.67 μs) | — |

According to the combinations of SCSs and CP lengths in Table 1, if UE performs synchronization based on a downlink synchronization signal delivered by a base station, an offset between data received by the UE and a carrier frequency of the UE may be any value between ±78.5 kHz based on LTE performance and requirement parameters and in consideration of a Doppler shift between the UE and the base station and a Doppler shift between UEs, where the LTE performance and the requirement parameters include the following: A frequency error of the base station is ±0.05 PPM, an error in synchronizing a frequency of a received downlink synchronization signal by the UE is ±0.1 PPM, and a maximum speed of the UE is 250 km/h. When an SCS is less than a maximum frequency offset, the UE cannot perform frequency offset estimation on the received data. Therefore, it is required that SCS≥120 kHz. In a case of SCS≥120 kHz, if a maximum communication distance between UEs is 300 m, a maximum time difference for the downlink synchronization signal arriving at different UEs is 1 μs, and a maximum transmission latency of data from a sending UE to a receiving UE is 1 μs, a difference between a timing of the receiving UE and time when the receiving UE receives the data may be any value between 0 μs and 2 μs. Therefore, the CP length should be greater than 2 μs; otherwise, the time when the data is received is beyond a CP range, and the receiving UE cannot properly receive the data. However, as shown in Table 1, when SCS≥120 kHz, there is no combination in which the CP length is greater than 2 μs. For example, when SCS=120 kHz, the NCP is only 0.59 μs.

It can be learned that in some potential frequency bands that may be selected for the Internet of Vehicles, the prior art in which the UE performs synchronization based on a downlink synchronization signal delivered by the base station cannot meet a requirement of UE in the Internet of Vehicles system for synchronizing a data signal transmitted by another UE.

In addition, in related communications technologies, a device maps, to an initial part for each data transmission, a preamble sequence that includes 12 identical short sequences and two long sequences, and after mapping to-be-transmitted data to another part to obtain a data signal, the device sends the data signal to a receive end. The preamble sequence in the data signal is used for AGC, time-frequency synchronization, and channel estimation. A total time domain length of the 12 short sequences is three orthogonal frequency division multiplexing (OFDM) symbols without CPs, in other words, four short sequences are mapped to each OFDM symbol. A total time domain length of the two long sequences is two OFDM symbols without CPs. When receiving the data signal, a receive end device may obtain the preamble sequence from the data signal, and perform a correlation operation on the preamble sequence and a local sequence to obtain a timing offset. A frequency offset is obtained by using a repeated structure of a plurality of short sequences and a plurality of long sequences, and then time-frequency synchronization is performed on the received data at the current time based on the frequency offset and the timing offset.

The foregoing communications technologies are asynchronous system-based communications technologies, time-frequency synchronization is required in a large range during each transmission, and the preamble sequence is not only used for time-frequency synchronization, but also required for AGC and channel estimation. Therefore, a design of the preamble sequence is complex. For example, the preamble sequence includes a plurality of sequences, the plurality of sequences need to occupy a plurality of symbols, and a plurality of sequences need to be mapped to one symbol. For example, four short sequences are mapped to one symbol, causing relatively high time-frequency synchronization overheads.

For the foregoing problems, in the technical solutions provided in the embodiments of the present disclosure, a first device maps, to at least the first OFDM symbol with a CP during single data transmission, a first sequence used to synchronize data transmitted at the current time, so that on a premise of synchronization between devices to some extent, a second device can synchronously receive, within coverage, data transmitted by all other devices, where being within the coverage means that a distance to the second device is less than or equal to a maximum communication distance between devices. In addition, the NR technology in the embodiments of the present disclosure is a synchronous system-based communications technology in which devices are synchronized to some extent, and time-frequency synchronization needs to be performed only in a relatively small range during each transmission. Therefore, synchronization can further be implemented by using fewer OFDM symbols than those in the preamble sequence.

The synchronization method provided in the embodiments of the present disclosure is applicable to the Internet of Vehicles system, a device-to-device (D2D) system, or another sidelink communications system, and the device independently selects a scenario to send a resource, regardless of participation of a network-side device. Specifically, the synchronization method is applied between devices. The device includes but is not limited to a vehicle, handheld user equipment, and the like, and can communicate with the network-side device, or directly communicate with another device. The network-side device refers to a device with a radio resource management function, and can communicate with a device or assist, as a central controller, communication between devices. For example, the network-side device may be a base station.

Figure 1:
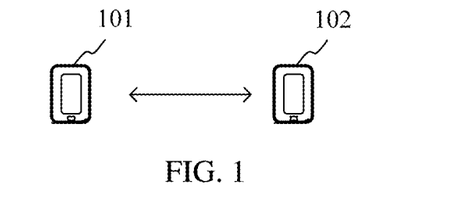
FIG. 1 is a schematic structural diagram of a system according to an embodiment of the present disclosure.

FIG. 1 is a schematic structural diagram of a system according to an embodiment of the present disclosure. Referring to FIG. 1, the system structure includes a first device 101 and a second device 102. The first device and the second device may communicate with each other directly and by using a network-side device.

The first device includes but is not limited to a vehicle, handheld user equipment, and the like. The first device may map to-be-transmitted data and a target sequence to symbols within a time unit to obtain a data signal and send the data signal to the second device. The target sequence is mapped to at least one symbol that includes the first symbol within the time unit, the first symbol includes a CP, and the target sequence is used by the second device to synchronize the data signal. It can be understood that in addition to the target sequence and the data, other content may be mapped to the symbols within the time unit.

The second device may receive the data signal sent by the first device, determine, in a process of receiving the data signal, a first sequence used for synchronization, and synchronize the data signal based on the received first sequence and the known target sequence used for synchronization, so as to accurately obtain data in the data signal sent by the first device.

Figure 2:
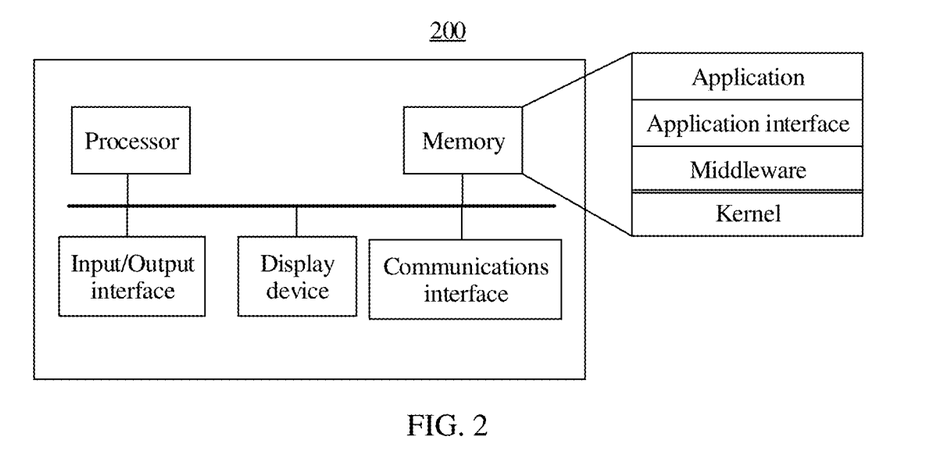
FIG. 2 is a schematic structural diagram of a synchronization apparatus 200 according to an embodiment of the present disclosure.

FIG. 2 is a block diagram of a synchronization apparatus 200 according to an embodiment of the present disclosure. The synchronization apparatus 200 may be the first device or the second device in the embodiment shown in FIG. 1, and may be specifically user equipment. Referring to FIG. 2, the synchronization apparatus 200 includes a processor and a memory. The memory stores at least one instruction, at least one program, a code set, or an instruction set, and the at least one instruction, the at least one program, the code set, or the instruction set is loaded and executed by the processor to implement a synchronization method in an embodiment shown in FIG. 3 or FIG. 5 below. The synchronization apparatus 200 may further include a communications interface, an input and output interface, and a display device.

The memory may include a high-speed random access memory (as a cache), and may further include a nonvolatile memory, for example, at least one disk storage device, a flash memory device, or another volatile solid-state storage device. Correspondingly, the memory may further include a memory controller, so as to provide the processor and the input and output interface with access to the memory. A bus is a circuit for connecting the described elements and implements transmission between these elements. For example, the processor receives a command from another element by using the bus, decodes the received command, and performs calculation or processes data according to the decoded command. The memory may include a program module, for example, a kernel, middleware, an application programming interface (API), and an application. The program module may include software, firmware, hardware, or at least two of the software, the firmware, and the hardware. The input and output interface forwards a command or data that a user enters through an input and output device (such as a sensor, a keyboard, and a touchscreen). The display device displays various pieces of information to the user. The communications interface is used to connect the synchronization apparatus 200 and another network device, user equipment, and a network. For example, the communications interface may be connected to the network in a wired or wireless manner, and connected to another external network device or user equipment.

Wireless communication may include at least one of the following: a 5G network (new radio, NR), wireless fidelity (Wi-Fi), Bluetooth (BT), near field communication (NFC), a global positioning system (GPS), and cellular communication (for example, a long term evolution (LTE) technology, long term evolution advanced (LTE-A), and wireless broadband access (WiBro). The synchronization apparatus 200 may be connected to the network through the communications interface, and a protocol used for communication between the synchronization apparatus 200 and the another network device may be supported by at least one of the application, the application programming interface (API), the middleware, the kernel, and the communications interface.

In an example embodiment, a computer-readable storage medium is further provided, such as a memory that stores a computer program, and the computer program may be loaded and executed by the processor to complete the synchronization method in the embodiment shown in FIG. 3 or FIG. 5 below. For example, the computer-readable storage medium may be a read-only memory (ROM), a random access memory (RAM), a compact disc read-only memory (CD-ROM), a tape, a floppy disk, or an optical data storage device.

In this embodiment of the present disclosure, there may be two mapping manners for the target sequence, used for synchronization, in the data signal sent by the first device to the second device. In one manner, the target sequence may be mapped at an equal spacing to at least one symbol within a time unit. In another manner, the target sequence may be mapped consecutively to at least one symbol within a time unit. For the two manners, the following describes a synchronization process between the first device and the second device with reference to embodiments in FIG. 3 and FIG. 5 respectively.

Figure 3:
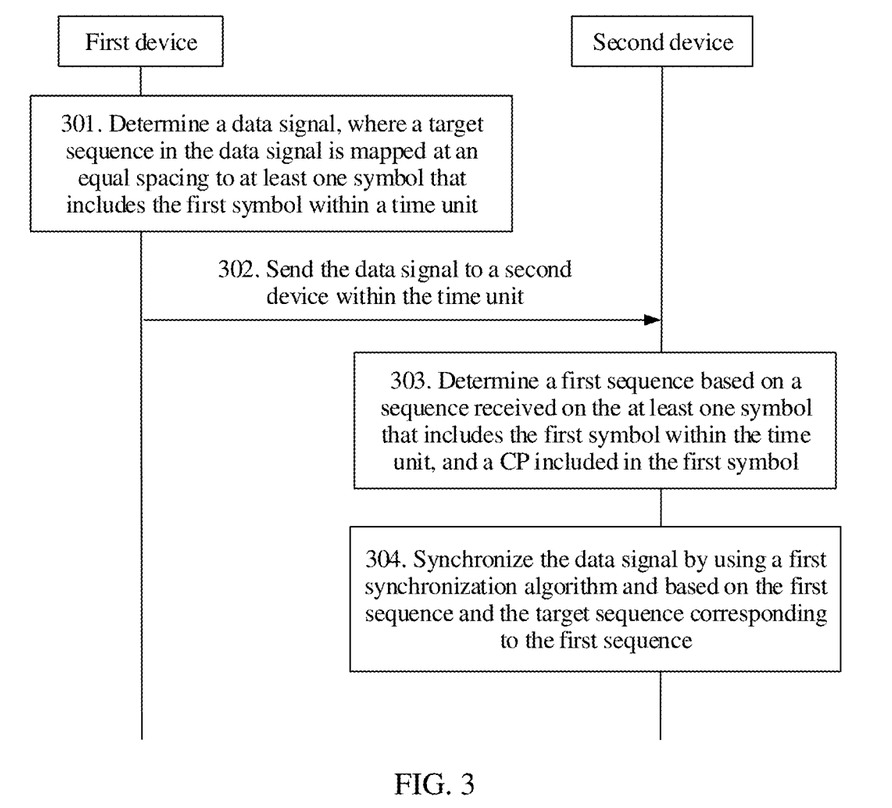
FIG. 3 is a schematic flowchart of a synchronization method according to an embodiment of the present disclosure.

FIG. 3 is a schematic flowchart of a synchronization method according to an embodiment of the present disclosure. Based on the interaction between the first device and the second device in the embodiment shown in FIG. 1, referring to FIG. 3, the synchronization method includes the following operations.

301. A first device determines a data signal, where a target sequence in the data signal is mapped at an equal spacing to at least one symbol that includes the first symbol within a time unit, data in the data signal is mapped to at least one another symbol in the time unit other than the at least one symbol, the first symbol includes a CP, and the target sequence is used by a second device to synchronize the data signal.

The symbol may be an OFDM symbol. The target sequence may be an M sequence modulated based on BPSK, or a ZC sequence. The data includes at least service data and/or scheduling assignment information. The time unit refers to a time unit for single data transmission, which includes but is not limited to the following cases: one TTI, a plurality of bundled consecutive TTIs, one sTTI, a plurality of bundled consecutive sTTIs, one subframe, a plurality of bundled consecutive subframes, one slot, or a plurality of bundled consecutive slots. This embodiment of the present disclosure does not constitute a limitation on a type of the symbol, a type of the data, and the time unit.

In this embodiment of the present disclosure, the first device may add to-be-transmitted data and a sequence used for synchronization into the data signal, and send the data signal to the second device, so that the second device can synchronously receive the data according to the sequence. Therefore, the first device needs to obtain the target sequence used for synchronization when determining the data signal sent to the second device. Obtaining of the target sequence includes but is not limited to the following embodiments:

In one embodiment, the configured target sequence is obtained.

For example, the first device may obtain the target sequence preconfigured in a protocol, and the protocol may be a protocol used for data signal transmission between the first device and the second device. In this manner, the protocol directly specifies the target sequence used by the second device to synchronize the data signal sent by the first device. When determining the data signal to be sent, the first device may obtain the target sequence from the protocol.

In one embodiment, the target sequence is obtained according to an obtaining rule.

For example, the first device may obtain the target sequence according to the obtaining rule indicated in a protocol. In this manner, the protocol directly indicates the obtaining rule or an obtaining path of the target sequence, and when determining the data signal to be sent, the first device may obtain the target sequence according to the obtaining rule or the obtaining path.

In one embodiment, a target sequence sent by a base station is received.

In this manner, the base station directly sends the target sequence used for synchronization to the first device. For example, the base station may send information carrying the target sequence to the first device, so that the first device can obtain the target sequence from the information.

In one embodiment, the target sequence is obtained according to an obtaining rule sent by a base station.

In this manner, the base station sends the obtaining rule or an obtaining path of the target sequence to the first device. For example, the base station may send information carrying the obtaining rule or the obtaining path of the target sequence to the first device, so that the first device can obtain the target sequence according to the obtaining rule or the obtaining path indicated in the information.

After obtaining the target sequence in any one of the foregoing manners or in another manner, the first device may map the target sequence at an equal spacing to the first symbol or to a plurality of symbols starting from the first symbol within the time unit during current transmission. Specifically, the first device may map the target sequence at an equal spacing to frequency domain corresponding to the first symbol or frequency domain corresponding to the plurality of symbols, a remaining part of the frequency domain is filled with 0 or the target sequence is cyclically mapped to the remaining part of the frequency domain, and a spacing for the equally-spaced mapping is at least one subcarrier. In one embodiment, when the spacing for the equally-spaced mapping is one subcarrier, the first device may map the target sequence at an interval of one subcarrier to frequency domain corresponding to the first symbol or frequency domain corresponding to the plurality of symbols in ascending order of frequency starting from a zero-frequency subcarrier. For example, if a subcarrier number is counted from 0, the target sequence is mapped to an even-numbered subcarrier, and 0 is mapped to an odd-numbered subcarrier. A remaining part of the frequency domain may be filled with 0 or the target sequence is cyclically mapped to the remaining part of the frequency domain. In this mapping manner, a time domain sequence corresponding to the first half symbol of the first symbol is the same as a time domain sequence corresponding to the last half symbol of the first symbol. When the mapped target sequence is a ZC sequence, a peak-to-average power ratio of a symbol on which the sequence is mapped is relatively low. When the target sequence is mapped to only one symbol (for example, the first symbol), synchronization overheads may be reduced. When the target sequence is mapped to a plurality of symbols, synchronization precision may be further improved. Filling the remaining part of the frequency domain with 0 may lower a peak-to-average power ratio of the data signal sent by the first device, reduce distortion of a synchronization sequence in time domain, and improve synchronization performance. The target sequence cyclically mapped to the remaining part of the frequency domain may be further used for channel estimation.

A sequence used by the second device to synchronize a transmitted data signal at each transmission is mapped to at least one symbol that includes the first symbol within a time unit during the data transmission, so that the second device can implement synchronization by using the sequence. In addition, in comparison with mapping to another symbol other than the first symbol, the first device maps the sequence used for synchronization to the first symbol, so that the second device does not need to store time domain data previous to the sequence, thereby reducing complexity of the second device. In addition, the plurality of bundled consecutive TTIs (sTTIs, slots, or subframes) require only one mapping process of the target sequence, thereby reducing overheads.

Figure 4:
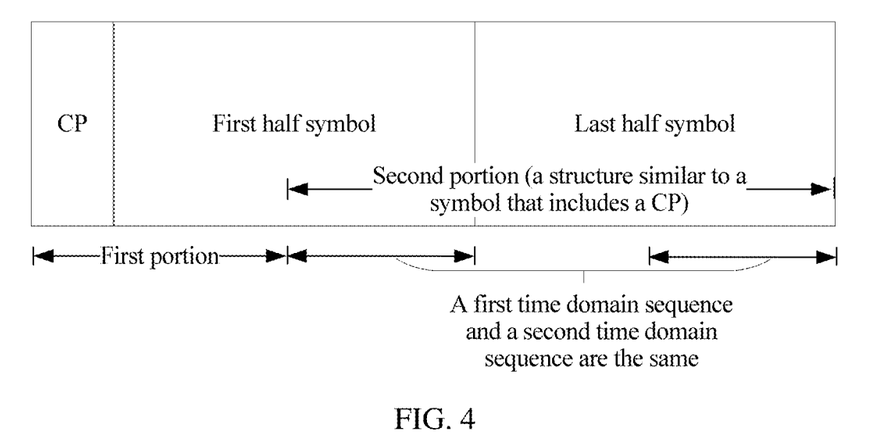
FIG. 4 is a schematic diagram of time domain of a symbol to which a target sequence is mapped at an equal spacing according to an embodiment of the present disclosure.

FIG. 4 is a schematic diagram of time domain of a symbol to which a target sequence is mapped at an equal spacing. The first symbol is used as an example, and the first symbol includes a CP. The first symbol may include a first portion and a second portion, the first portion includes the CP, and a time domain sequence corresponding to a head part of the second portion is the same as a time domain sequence corresponding to a tail part of the second portion. A length of the head part of the second portion is greater than a CP length of a normal symbol (a symbol to which data is mapped). For example, the CP length may be an NCP length corresponding to SCS=120 kHz in Table 1. The first portion includes the CP and a part of the first half symbol, and may be used by the second device to perform AGC on a transmitted data signal at the current time. A structure of the second portion is similar to a symbol whose subcarrier spacing is doubled and that includes a CP, and the second portion may be used by the second device to synchronize the transmitted data signal at the current time. An increase in a subcarrier spacing may enlarge a frequency offset scope applicable to frequency synchronization.

In a process of determining the data signal, in addition to mapping the target sequence to the at least one symbol that includes the first symbol within the time unit during current transmission, the first device may map data to be transmitted at the current time to another one or more symbols within the time unit other than the at least one symbol. For example, the target sequence is mapped to the first symbol, the data is mapped to a second symbol and/or a third symbol, or the target sequence is mapped to the first symbol and a second symbol, and the data is mapped to a third symbol. Service data and/or scheduling assignment information are/is carried in the data signal as the to-be-transmitted data, so that a device that receives the data signal can synchronously receive the service data and/or the scheduling assignment information.

It can be understood that in addition to mapping the target sequence and the data to the symbol within the time unit during current transmission, the first device may map other content to a remaining symbol within the time unit to obtain the data signal to be transmitted during current transmission. This is not limited in this embodiment of the present disclosure. In one embodiment, the last or the last half symbol at the tail part within the time unit during current transmission is a guard period, and nothing is sent on the last or the last half symbol to prevent a tail part of data transmitted by the first device and received by a device (such as the second device) or some devices from overlapping with an initial part of data transmission of another device, so as to avoid causing interference.

It should be noted that this embodiment of the present disclosure is described by using an example in which the first device determines one data signal during single data transmission. In practice, for each data signal during each data transmission, the first device may determine each data signal in a same manner. In this way, each data signal includes a target sequence mapped to at least one symbol that includes the first symbol within a time unit corresponding to the data signal.

302. The first device sends the data signal to the second device within the time unit.

In this embodiment of the present disclosure, after mapping the sequence used for synchronization and the data to the symbol within the time unit during current transmission to obtain the data signal, the first device may send the data signal to the second device, so that the second device synchronizes the data signal during current transmission based on the sequence used for synchronization to accurately obtain the data in the data signal.

303. When receiving the data signal from the first device within the time unit, the second device determines a first sequence based on a sequence received on the at least one symbol that includes the first symbol within the time unit, and the CP included in the first symbol, where the data signal includes the data and the first sequence, and the first sequence is used by the second device to synchronize the data signal.

In this embodiment of the present disclosure, the protocol may specify a location for mapping the sequence used for synchronization to the symbol within the time unit, for example, on the first symbol. In a process of receiving the data signal within the time unit, the second device may receive the sequence from a corresponding location, determine the first sequence used for synchronization based on the received sequence, and then synchronize the data signal based on the first sequence, so as to accurately obtain the data sent by the first device. The second device may determine a start location of the first sequence based on the CP included in the first symbol, and then determine the first sequence based on the start location.

304. The second device synchronizes the data signal by using a first synchronization algorithm and based on the first sequence and the target sequence corresponding to the first sequence.

The target sequence corresponding to the first sequence is a sequence sent by the first device and used by the second device to synchronize the data signal. However, because a timing offset and a frequency offset easily occur in a data signal transmission process, the second device receives the first sequence.

In this embodiment of the present disclosure, the second device may synchronize the data signal based on the received first sequence and a known sequence used for synchronization (namely, a target sequence originally sent by a transmit end). Therefore, the second device needs to obtain the target sequence corresponding to the first sequence before synchronizing the data signal. Similar to the process in which the first device obtains the target sequence in operation 301, the second device may obtain the target sequence preconfigured in the protocol; or obtain the target sequence according to the obtaining rule indicated in the protocol, and a specific process is not described again. For the equally-spaced mapping manner of the target sequence in operation 301, the second device may determine a synchronization algorithm used for synchronization based on the equally-spaced mapping, such as the first synchronization algorithm, and then synchronize the data signal by using the first synchronization algorithm and based on the first sequence and the target sequence.

In one embodiment, for the first symbol to which the sequence used for synchronization is mapped at an equal spacing shown in FIG. 4, the second device may synchronize the data signal by using the second portion of the first symbol. Specifically, the first synchronization algorithm may include the following operations A to C:

Operation A: Obtain a timing offset for current transmission by using a frequency domain time synchronization algorithm and based on the first sequence and the target sequence.

The timing offset refers to an offset between time of receiving the data by the second device and timing of the second device.

Operation A specifically includes: transforming, into frequency domain, the first symbol to which the first sequence is mapped; performing pointwise multiplication on a conjugate of a location corresponding to the target sequence in frequency domain to obtain a frequency domain channel; transforming the frequency domain channel into time domain and obtaining a modulus value; and determining the timing offset for current transmission based on a location corresponding to a maximum modulus value. When a CP length of a normal symbol cannot meet a time synchronization requirement, time synchronization is implemented by using the frequency domain time synchronization algorithm. Compared with a time domain cross-correlation algorithm, the frequency domain time synchronization algorithm is less complex.

It should be noted that operation A is only one embodiment in which the second device obtains the timing offset. In practice, the second device may further obtain the timing offset in another manner. For example, the second device may perform a cross-correlation operation on the first sequence and the target sequence to obtain a correlation peak, and obtain the timing offset for current transmission based on a location of the correlation peak.

Operation B: Obtain a frequency offset for current transmission by using a CP-based frequency synchronization algorithm and based on the first symbol to which the first sequence is mapped.

The frequency offset refers to an offset between a carrier frequency received by the second device and a carrier frequency of the second device.

In this embodiment of the present disclosure, the second portion of the first symbol is a structure similar to a symbol that includes a CP. Correspondingly, operation B specifically includes: obtaining the frequency offset for current transmission based on a phase difference between a first time domain sequence and a second time domain sequence corresponding to the first symbol. The first time domain sequence is a time domain sequence corresponding to a head part of the second portion of the first symbol, and the second time domain sequence is a time domain sequence corresponding to a tail part of the first symbol.

In one embodiment, the second device may obtain the phase difference between the first time domain sequence and the second time domain sequence by performing the following process: performing pointwise multiplication on the second time domain sequence and a conjugate of the first time domain sequence, adding up results of the pointwise multiplication to obtain a phase of a complex number, and using the phase as the phase difference between the two sequences.

In one embodiment, a process of obtaining the frequency offset by the second device based on the phase difference may include: dividing the phase difference between the first time domain sequence and the second time domain sequence by a time interval between the two sequences to obtain the frequency offset, where the time interval between the two sequences refers to a time location interval between the two sequences in the first symbol.

In operation B, the frequency offset for current transmission is obtained based on the second portion (the structure similar to the symbol that includes the CP) of the first symbol to which the sequence used for synchronization is mapped. As shown in FIG. 4, on a first device side, the time domain sequence corresponding to the head part of the second portion of the first symbol is the same as the time domain sequence corresponding to the tail part of the second portion of the first symbol. Because of channel impact in a data signal transmission process, on a second device side, there is the phase difference between the first time domain sequence and the second time domain sequence, so that the second device can obtain the frequency offset for current transmission based on the phase difference. On embodiment for obtaining the frequency offset is provided.

In addition, in the symbol to which the sequence used for synchronization is mapped at an equal spacing, a length (for example, a length of the head part of the second portion of the first symbol) of the CP in the structure similar to the symbol that includes the CP is greater than the length of the CP in the normal symbol, and a greater timing offset can be tolerated by the frequency domain time synchronization algorithm. In addition, the structure similar to the symbol that includes the CP may be used to obtain the frequency offset, for example, implement frequency synchronization based on a cyclic prefix-based frequency synchronization algorithm, so as to overcome a multipath effect and improve frequency synchronization precision.

Operation C: Obtain data in the data signal based on the timing offset and the frequency offset.

After obtaining the timing offset, the second device may determine timing for current transmission based on the timing offset and adjust an initial location of a discrete Fourier transform (FFT) algorithm window, so as to implement time synchronization of the data during current transmission. After the frequency offset is obtained, a phase of each time domain sample point of the data signal may be adjusted based on the frequency offset to implement frequency offset correction of the data signal, so as to implement frequency synchronization of the data during current transmission. The timing offset and the frequency offset are eliminated through implementation of time synchronization and frequency synchronization, so that the second device can accurately obtain data in the data signal. For example, after the time synchronization and the frequency synchronization are implemented, the second device may obtain the data on at least one another symbol other than the symbol to which the sequence used for synchronization is mapped.

In one embodiment, in a process of receiving the data signal, the second device may further perform AGC on the data based on the first portion of the first symbol to which the sequence used for synchronization is mapped within the time unit for current transmission. Because the first symbol includes the CP, the second device may perform AGC starting from the CP. However, a time length for performing AGC is fixed. Therefore, a time length used to perform AGC is shorter in the first symbol. In comparison with performing AGC starting from an initial part of the first symbol that does not include a CP, a time length for impacting the first symbol by AGC is reduced. In addition, in comparison with the prior art in which a sequence used for performing AGC needs to be mapped to an additional symbol, in this embodiment of the present disclosure, the sequence used for synchronization is mapped to the first symbol, AGC is performed by using the part that includes the CP and that is in the first symbol, and synchronization is implemented by using overheads of only one symbol. Further, if a time length for performing AGC is shorter than a time length of half a symbol, a length of a head part of the second portion (the structure similar to the symbol that includes the CP) in the first symbol is greater than the CP length of the normal symbol. When the CP length of the normal symbol cannot meet a requirement of the frequency domain time synchronization algorithm with relatively low complexity, the structure similar to the symbol that includes the CP may meet the requirement of the algorithm. Therefore, the structure may be used to implement time synchronization by using the low-complexity algorithm.

A sequence used for synchronization is carried in a data signal for each transmission, so that the second device can obtain, by using the sequence, a timing offset to implement time synchronization. When the CP length of the normal symbol cannot meet a time synchronization requirement, the second device may still implement time synchronization by using the sequence used for synchronization and a time synchronization algorithm with low complexity, and obtain the frequency offset by using the structure that is similar to the symbol including the CP and that is in the symbol to which the sequence is mapped at an equal spacing, so as to implement frequency synchronization, thereby resolving a prior-art problem that the CP length cannot meet a synchronization requirement.

It should be noted that the technical solutions of this embodiment of the present disclosure are on a premise that devices are synchronized to some extent. For example, after devices synchronize, to some extent, a downlink synchronization signal sent by a base station, a sequence used to synchronize a data signal for each transmission is mapped at an equal spacing to at least one symbol that includes the first symbol within a time unit for current transmission, so that any device can synchronize, by using the sequence, a data signal sent by another device within a communication distance.

According to the method provided in this embodiment of the present disclosure, the first device maps, at an equal spacing to the at least one symbol that includes the first symbol within the time unit for each transmission, the sequence used by the second device to synchronize the data signal during current transmission, so that the second device can synchronize the data signal based on the received sequence and the known sequence used for synchronization, thereby meeting a requirement of a device in an Internet of Vehicles system for synchronizing a data signal transmitted by another device.

The second device may obtain a timing offset by using the sequence used for synchronization, so as to implement time synchronization. When a CP length of a normal symbol cannot meet a time synchronization requirement, the second device may implement time synchronization by using the sequence used for synchronization and a time synchronization algorithm with low complexity, thereby reducing algorithm complexity of time synchronization. In addition, the second device may further obtain a frequency offset by using the structure that is similar to the symbol including the CP and that is in the symbol to which the sequence is mapped at an equal spacing, so as to implement frequency synchronization and improve algorithm precision of frequency synchronization.

In addition, the symbol to which the sequence used for synchronization is mapped includes a CP, so that the second device can perform AGC starting from the CP. However, a time length for performing AGC is fixed, a time length used to perform AGC is shorter in the first symbol, thereby reducing a time length for impacting the first symbol by AGC. When the sequence used for synchronization is mapped to the first symbol that includes the CP, AGC may be performed by using a part that includes the CP and that is in the first symbol, and data sent by another device within a communication distance can be synchronously received by a device by using overheads of only one symbol.

The embodiment shown in FIG. 3 is a process in which the second device synchronizes the data signal sent by the first device when the first device maps the sequence used for synchronization at an equal spacing. In practice, the first device may alternatively map the sequence used for synchronization in a consecutive mapping manner. A synchronization process in this case is described in an embodiment of FIG. 5 below.

Figure 5:
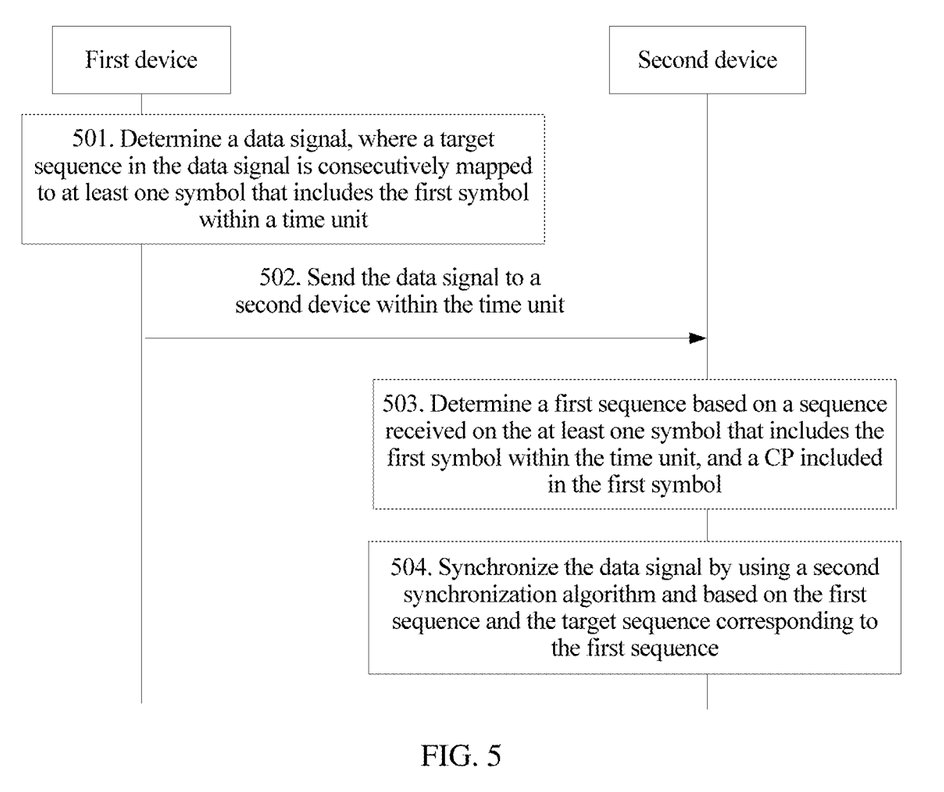
FIG. 5 is a schematic flowchart of a synchronization method according to an embodiment of the present disclosure.

FIG. 5 is a schematic flowchart of a synchronization method according to an embodiment of the present disclosure. Based on the interaction between the first device and the second device in the embodiment shown in FIG. 1, referring to FIG. 5, the synchronization method includes the following operations.

501. A first device determines a data signal, where a target sequence in the data signal is consecutively mapped to at least one symbol that includes the first symbol within a time unit, data in the data signal is mapped to at least one another symbol in the time unit other than the at least one symbol, the first symbol includes a CP, and the target sequence is used by a second device to synchronize the data signal.

In this embodiment of the present disclosure, a process in which the first device determines the data signal may include: obtaining the target sequence used for synchronization; consecutively mapping the target sequence to the at least one symbol that includes the first symbol within the time unit for current transmission; and mapping the to-be-transmitted data to the at least one another symbol in the time unit other than the at least one symbol. A process in which the first device obtains the target sequence is similar to the process of obtaining the target sequence in operation 301 in the embodiment shown in FIG. 3, and details are not described herein again.

For mapping of the target sequence, the first device may consecutively map the target sequence to the first symbol or to a plurality of symbols starting from the first symbol within the time unit for current transmission. Specifically, the first device may consecutively map the target sequence to frequency domain corresponding to the first symbol or frequency domain corresponding to the plurality of symbols, a remaining part of frequency domain is filled with 0 or the target sequence is cyclically mapped to the remaining part. Through consecutive mapping of the sequence used for synchronization, the following may be avoided: Two correlation peaks with similar sizes during time synchronization occur, which causes additional complexity when the second device synchronizes the data signal sent by the first device.

502. The first device sends the data signal to the second device within the time unit.

503. When receiving the data signal from the first device within the time unit, the second device determines a first sequence based on a sequence received on the at least one symbol that includes the first symbol within the time unit, and the CP included in the first symbol, where the data signal includes the data and the first sequence, and the first sequence is used by the second device to synchronize the data signal.

Operation 502 and operation 503 are similar to operation 302 and operation 303 in the embodiment shown in FIG. 3, and details are not described herein again.

504. The second device synchronizes the data signal by using a second synchronization algorithm and based on the first sequence and the target sequence corresponding to the first sequence.

In this embodiment of the present disclosure, for the consecutive mapping manner of the target sequence in operation 501, the second device may determine a synchronization algorithm used for synchronization based on the consecutive mapping, such as the second synchronization algorithm, and then synchronize the data signal by using the second synchronization algorithm and based on the first sequence and the target sequence.

In one embodiment, the second synchronization algorithm may include: performing a cross-correlation operation on a third time domain sequence and a fourth time domain sequence to obtain a correlation peak, where the third time domain sequence is a time domain sequence corresponding to a remaining part in the first symbol except a part that includes the cyclic prefix, and the fourth time domain sequence is a time domain sequence corresponding to the target sequence; obtaining timing for current data transmission based on a location of the correlation peak; multiplying the third time domain sequence by a conjugate of a part corresponding to the fourth time domain sequence to obtain a fifth time domain sequence; obtaining a frequency offset for current data transmission based on the fifth time domain sequence; and obtaining the data in the data signal based on the timing and the frequency offset. In one embodiment, a process in which the second device obtains the frequency offset based on the fifth time domain sequence may include: obtaining the frequency offset based on a phase difference between the first half part and the last half part of the fifth time domain sequence. A manner of obtaining the phase difference and a manner of obtaining the frequency offset based on the phase difference are described in operation B of operation 304, and details are not described again.

In one embodiment, in a process of receiving the data signal, the second device may further perform AGC on the data based on the part that includes the cyclic prefix and that is in the first symbol to which the sequence used for synchronization is mapped within the time unit for current transmission. Because the first symbol includes the CP, the second device may perform AGC starting from the CP. However, a time length for performing AGC is fixed. Therefore, a time length used to perform AGC is shorter in the first symbol. In comparison with performing AGC starting from an initial part of the first symbol that does not include a CP, a time length for impacting the first symbol by AGC is reduced.

It should be noted that the technical solutions of this embodiment of the present disclosure are on a premise that devices are synchronized to some extent. The sequence used to synchronize the data signal for each transmission is consecutively mapped to the at least one symbol that includes the first symbol within the time unit for current transmission, so that any device can synchronize, by using the sequence, a data signal sent by another device within a communication distance.

According to the method provided in this embodiment of the present disclosure, the first device consecutively maps, to the at least one symbol that includes the first symbol within the time unit for each transmission, the sequence used by the second device to synchronize the data signal during current transmission, so that the second device can synchronize the data signal based on the received sequence and a known sequence used for synchronization, thereby meeting a requirement of a device in an Internet of Vehicles system for synchronizing a data signal transmitted by another device.

Figure 6:
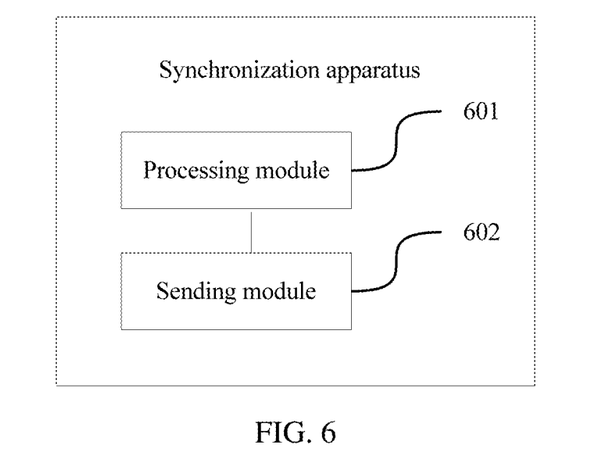
FIG. 6 is a schematic structural diagram of a synchronization apparatus according to an embodiment of the present disclosure.

FIG. 6 is a schematic structural diagram of a synchronization apparatus according to an embodiment of the present disclosure. Referring to FIG. 6, the apparatus includes a processing module 601 and a sending module 602.

The processing module 601 is configured to determine a data signal, where a target sequence in the data signal is mapped to at least one symbol that includes the first symbol within a time unit, data in the data signal is mapped to at least one another symbol in the time unit other than the at least one symbol, the first symbol includes a cyclic prefix, and the target sequence is used by a second device to synchronize the data signal.

The sending module 602 is configured to send the data signal to the second device in the time unit.

In one embodiment, the target sequence is mapped at an equal spacing to frequency domain corresponding to the at least one symbol, a remaining part of the frequency domain is filled with 0 or the target sequence is cyclically mapped to the remaining part, and a spacing for the equally-spaced mapping is at least one subcarrier. Alternatively, the target sequence is consecutively mapped to frequency domain corresponding to the at least one symbol, and a remaining part of the frequency domain is filled with 0 or the target sequence is cyclically mapped to the remaining part.

In one embodiment, the data includes at least service data and/or scheduling assignment information.

In one embodiment, the time unit includes: one transmission time interval TTI, a plurality of bundled consecutive TTIs, one short transmission time interval sTTI, a plurality of bundled consecutive sTTIs, one subframe, a plurality of bundled consecutive subframes, one slot slot, or a plurality of bundled consecutive slots.

In one embodiment, each data signal includes a target sequence mapped to at least one symbol that includes the first symbol within a time unit corresponding to the data signal.

In one embodiment, the target sequence is an M sequence modulated based on binary phase shift keying BPSK, or a ZC sequence.

According to the apparatus provided in this embodiment of the present disclosure, a sequence used to synchronize a data signal for each transmission is mapped at an equal spacing to at least one symbol that includes the first symbol within a time unit for current transmission, so that a device that receives the data signal can synchronize the data signal based on the received sequence and a known sequence used for synchronization, thereby meeting a requirement of a device in an Internet of Vehicles system for synchronizing a data signal transmitted by another device.

Figure 7:
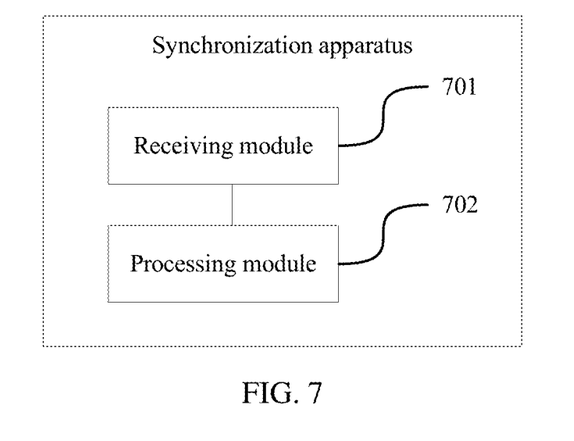
FIG. 7 is a schematic structural diagram of a synchronization apparatus according to an embodiment of the present disclosure.

FIG. 7 is a schematic structural diagram of a synchronization apparatus according to an embodiment of the present disclosure. Referring to FIG. 7, the apparatus includes a receiving module 701 and a processing module 702.

The receiving module 701 is configured to receive a data signal from a first device in a time unit, where the data signal includes data and a first sequence, and the first sequence is used by the second device to synchronize the data signal.

The processing module 702 is configured to: determine the first sequence based on a sequence received on at least one symbol that includes the first symbol within the time unit, and a cyclic prefix included in the first symbol; and synchronize the data signal based on the first sequence and a target sequence corresponding to the first sequence.

In one embodiment, the target sequence is mapped at an equal spacing to frequency domain corresponding to the at least one symbol, and a spacing for the equally-spaced mapping is at least one subcarrier, or the target sequence is consecutively mapped to frequency domain corresponding to the at least one symbol.

In one embodiment, the data includes at least service data and/or scheduling assignment information.

In one embodiment, the time unit includes: one transmission time interval TTI, a plurality of bundled consecutive TTIs, one short transmission time interval sTTI, a plurality of bundled consecutive sTTIs, one subframe, a plurality of bundled consecutive subframes, one slot slot, or a plurality of bundled consecutive slots.

In one embodiment, the target sequence is an M sequence modulated based on binary phase shift keying BPSK, or a ZC sequence.

In one embodiment, the processing module 702 is further configured to perform the process of obtaining the target sequence in operation 304.

In one embodiment, the processing module 702 is further configured to: perform a process of determining the synchronization algorithm in operation 304 or operation 504 and perform a process of synchronizing the data signal in operation 304 or operation 504.

In one embodiment, the first symbol includes a first portion and a second portion, the first portion includes the cyclic prefix, a time domain sequence corresponding to a head part of the second portion is the same as a time domain sequence corresponding to a tail part of the second portion, and a length of the head part is greater than a length of the cyclic prefix.

In one embodiment, the processing module 702 is further configured to perform the process of performing AGC on the data in operation 304.

In one embodiment, the processing module 702 is configured to perform the process of synchronizing the data signal in operation 304.

In one embodiment, the processing module 702 is configured to perform the process of synchronizing the data signal in operation 504.

According to the apparatus provided in this embodiment of the present disclosure, the first device maps, at an equal spacing to at least one symbol that includes the first symbol within a time unit for each transmission, a sequence used by the second device to synchronize a data signal during current transmission, so that the second device can synchronize the data signal based on the received sequence and a known sequence used for synchronization, thereby meeting a requirement of a device in an Internet of Vehicles system for synchronizing a data signal transmitted by another device.

The second device may obtain a timing offset by using the sequence used for synchronization, so as to implement time synchronization. When a CP length of a normal symbol cannot meet a time synchronization requirement, the second device may implement time synchronization by using the sequence used for synchronization and a time synchronization algorithm with low complexity, thereby reducing algorithm complexity of time synchronization. In addition, the second device may further obtain a frequency offset by using a structure that is similar to a symbol including a CP and that is in the symbol to which the sequence is mapped at an equal spacing, so as to implement frequency synchronization and improve algorithm precision of frequency synchronization.

In addition, the symbol to which the sequence used for synchronization is mapped includes a CP, so that the second device can perform AGC starting from the CP. However, a time length for performing AGC is fixed, a time length used to perform AGC is shorter in the first symbol, thereby reducing a time length for impacting the first symbol by AGC. When the sequence used for synchronization is mapped to the first symbol that includes the CP, AGC may be performed by using a part that includes the CP and that is in the first symbol, and data sent by another device within a communication distance can be synchronously received by a device by using overheads of only one symbol.

It should be noted that when the synchronization apparatuses provided in the foregoing embodiments perform synchronization, division of the foregoing functional modules is used only as an example for description. In one embodiment, the foregoing functions may be allocated to different functional modules and implemented based on a requirement, that is, an internal structure of a device is divided into different functional modules for implementing all or some of the functions described above. In addition, the synchronization apparatus embodiments provided in the foregoing embodiment have a same concept as the synchronization method embodiments. For a specific embodiment of the synchronization apparatus, refer to the method embodiments. Details are not described herein again.

A person of ordinary skill in the art may understand that all or some of the operations of the embodiments may be implemented by hardware or a program instructing related hardware. The program may be stored in a computer-readable storage medium. The storage medium may include: a read-only memory, a magnetic disk, or an optical disc.

The foregoing descriptions are merely embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A synchronization method, wherein the method is applied to a first device, and comprises:
    determining a data signal, wherein a target sequence in the data signal is mapped to at least one symbol that comprises a first symbol within a time unit, data in the data signal is mapped to at least one another symbol within the time unit other than the at least one symbol, the first symbol comprises a cyclic prefix, and the target sequence is used by a second device to synchronize the data signal, and
    wherein the first symbol comprises a first portion and a second portion, the first portion comprising the cyclic prefix and the second portion comprising a head part and a tail part, wherein the second portion follows the first portion in a time domain such that the head part of the second portion is between, in the time domain, the cyclic prefix and the tail part of the second portion, and wherein a time domain sequence corresponding to the head part of the second portion is the same as a time domain sequence corresponding to the tail part of the second portion; and
    sending the data signal to the second device in the time unit.

2. The method according to claim 1, wherein
    the target sequence is mapped at an equal spacing to a frequency domain corresponding to the at least one symbol, a remaining part of the frequency domain is filled with 0 or the target sequence is cyclically mapped to the remaining part, and a spacing for the equally-spaced mapping is at least one subcarrier; or
    the target sequence is consecutively mapped to a frequency domain corresponding to the at least one symbol, and a remaining part of the frequency domain is filled with 0 or the target sequence is cyclically mapped to the remaining part.

3. The method according to claim 1, wherein the data comprises at least service data and/or scheduling assignment information.

4. The method according to claim 1, wherein the time unit comprises one transmission time interval (TTI), a plurality of bundled consecutive TTIs, one short transmission time interval (sTTI), a plurality of bundled consecutive sTTIs, one subframe, a plurality of bundled consecutive subframes, one slot slot, or a plurality of bundled consecutive slots.

5. The method according to claim 1, wherein the target sequence is an M sequence modulated based on binary phase shift keying (BPSK), or a zero correlation (ZC) sequence.

6. A synchronization method, wherein the method is applied to a second device, and comprises:
    receiving a data signal from a first device in a time unit, wherein the data signal comprises data and a first sequence, and the first sequence is used by the second device to synchronize the data signal;
    determining the first sequence based on a target sequence received on at least one symbol that comprises a first symbol within the time unit, and a cyclic prefix comprised in the first symbol, and
    wherein the first symbol comprises a first portion and a second portion, the first portion comprising the cyclic prefix and the second portion comprising a head part and a tail part, wherein the second portion follows the first portion in a time domain such that the head part of the second portion is between, in the time domain, the cyclic prefix and the tail part of the second portion, and wherein a time domain sequence corresponding to the head part of the second portion is the same as a time domain sequence corresponding to the tail part of the second portion; and
    synchronizing the data signal based on the first sequence and the target sequence corresponding to the first sequence.

7. The method according to claim 6, wherein the target sequence is mapped at an equal spacing to a frequency domain corresponding to the at least one symbol, and a spacing for the equally-spaced mapping is at least one subcarrier; or the target sequence is consecutively mapped to a frequency domain corresponding to the at least one symbol.

8. The method according to claim 6, wherein the data comprises at least service data and/or scheduling assignment information.

9. The method according to claim 6, wherein the time unit comprises one transmission time interval (TTI), a plurality of bundled consecutive TTIs, one short transmission time interval (sTTI), a plurality of bundled consecutive sTTIs, one subframe, or a plurality of bundled consecutive subframes.

10. The method according to claim 6, wherein the target sequence is an M sequence modulated based on binary phase shift keying (BPSK), or a zero correlation (ZC) sequence.

11. The method according to claim 6, wherein before the synchronizing the data signal based on the first sequence and the target sequence corresponding to the first sequence, the method further comprises:
  obtaining the target sequence that is preconfigured; or
  obtaining the target sequence according to an obtaining rule; or
  receiving the target sequence sent by a base station.

12. The method according to claim 7, wherein the method further comprises:
  determining, based on the equally-spaced mapping or the consecutive mapping, a synchronization algorithm used for synchronization; and
  the synchronizing the data signal based on the first sequence and the target sequence corresponding to the first sequence comprises synchronizing the data signal by using the synchronization algorithm and based on the first sequence and the target sequence.

13. A synchronization apparatus, wherein the apparatus is applied to a first device, and comprises:
  a processing module, configured to determine a data signal, wherein a target sequence in the data signal is mapped to at least one symbol that comprises a first symbol within a time unit, data in the data signal is mapped to at least one another symbol in the time unit other than the at least one symbol, the first symbol comprises a cyclic prefix, and the target sequence is used by a second device to synchronize the data signal, and
  wherein the first symbol comprises a first portion and a second portion, the first portion comprising the cyclic prefix and the second portion comprising a head part and a tail part, wherein the second portion follows the first portion in a time domain such that the head part of the second portion is between, in the time domain, the cyclic prefix and the tail part of the second portion, and wherein a time domain sequence corresponding to the head part of the second portion is the same as a time domain sequence corresponding to the tail part of the second portion; and
  a sending module, configured to send the data signal to the second device in the time unit.

14. The apparatus according to claim 13, wherein the target sequence is mapped at an equal spacing to a frequency domain corresponding to the at least one symbol, a remaining part of the frequency domain is filled with 0 or the target sequence is cyclically mapped to the remaining part, and a spacing for the equally-spaced mapping is at least one subcarrier; or
  the target sequence is consecutively mapped to a frequency domain corresponding to the at least one symbol, and a remaining part of the frequency domain is filled with 0 or the target sequence is cyclically mapped to the remaining part.

15. The apparatus according to claim 13, wherein the data comprises at least service data and/or scheduling assignment information.

16. The apparatus according to claim 13, wherein the time unit comprises one transmission time interval (TTI), a plurality of bundled consecutive TTIs, one short transmission time interval (sTTI), a plurality of bundled consecutive sTTIs, one subframe, a plurality of bundled consecutive subframes, one slot slot, or a plurality of bundled consecutive slots.

17. The apparatus according to claim 13, wherein the target sequence is an M sequence modulated based on binary phase shift keying (BPSK), or a zero correlation (ZC) sequence.

* * * * *